US012078591B2

(12) United States Patent
Ghasemi Afshar

(10) Patent No.: US 12,078,591 B2
(45) Date of Patent: Sep. 3, 2024

(54) OPTICAL MEASURING ASSEMBLY AND GAS SENSOR COMPRISING SAME

(71) Applicant: OSRAM Opto Semiconductors GmbH, Regensburg (DE)

(72) Inventor: Farhang Ghasemi Afshar, Wenzenbach (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 303 days.

(21) Appl. No.: 17/597,040

(22) PCT Filed: Jul. 2, 2020

(86) PCT No.: PCT/EP2020/068627
§ 371 (c)(1),
(2) Date: Dec. 23, 2021

(87) PCT Pub. No.: WO2021/004874
PCT Pub. Date: Jan. 14, 2021

(65) Prior Publication Data
US 2022/0236174 A1     Jul. 28, 2022

(30) Foreign Application Priority Data
Jul. 10, 2019   (DE) .......................... 102019210163.1

(51) Int. Cl.
*G01N 21/3504*    (2014.01)
*G01N 21/03*     (2006.01)

(52) U.S. Cl.
CPC ....... *G01N 21/3504* (2013.01); *G01N 21/031* (2013.01); *G01N 2021/3513* (2013.01)

(58) Field of Classification Search
None
See application file for complete search history.

(56) References Cited

U.S. PATENT DOCUMENTS 3,394,253 A * 7/1968 Harrick .................. G01N 21/05
                                                250/353
5,060,508 A * 10/1991 Wong ................... G01N 1/2258
                                                356/437
(Continued)

FOREIGN PATENT DOCUMENTS

DE    102008001711 A1    11/2009
JP      H07198600 A       8/1995
(Continued)

OTHER PUBLICATIONS

English translation of JP 2005-337879 A (Year: 2005).*

*Primary Examiner* — Thomas R Artman
(74) *Attorney, Agent, or Firm* — Slater Matsil, LLP

(57) ABSTRACT

In an embodiment an optical measuring arrangement includes a tube section-shaped hollow body having a central axis extending from a first end face to an opposite second end face of the hollow body, wherein a spiral-shaped hollow light guide is formed in an inner surface of the hollow body by the inner surface being formed at least partially from a light-reflecting material and being formed as a hollow spiral winding around the central axis with a hollow cross section open toward the central axis, a light source arranged at a first spiral end and lying on the first end face of the hollow body, the light source configured to emit a light beam into the hollow spiral so that the light beam is tangentially to its turns and, after a plurality of reflections inside the hollow spiral, emerges from a second spiral end lying on the second end face of the hollow body and a light detector arranged at the second spiral end, the light detector configured to detect the emerging light beam and to output an electronic measurement signal as a function of the detected light beam.

20 Claims, 8 Drawing Sheets

(56) References Cited

U.S. PATENT DOCUMENTS

| | | | |
|---|---|---|---|
| 5,747,808 A * | 5/1998 | Wong | G01N 21/35 |
| | | | 250/343 |
| 6,921,899 B2 * | 7/2005 | Martin | G01N 21/03 |
| | | | 250/353 |
| 7,420,171 B2 | 9/2008 | Hopkins et al. | |
| 7,449,694 B2 * | 11/2008 | Yi | G01N 21/3504 |
| | | | 250/339.13 |
| 7,507,967 B2 * | 3/2009 | Uchida | G01N 21/0303 |
| | | | 250/343 |
| 7,609,375 B2 * | 10/2009 | Park | G01N 21/3504 |
| | | | 356/440 |
| 8,368,895 B2 * | 2/2013 | Martin | G01N 21/05 |
| | | | 356/437 |
| 11,150,130 B2 * | 10/2021 | Sabry | G01J 3/021 |
| 2003/0058439 A1 | 3/2003 | Martin | |
| 2005/0180889 A1 | 8/2005 | Martin | |
| 2006/0138328 A1 * | 6/2006 | Hopkins | G01N 21/05 |
| | | | 250/339.13 |
| 2006/0219923 A1 * | 10/2006 | Uchida | G01N 21/3504 |
| | | | 250/343 |
| 2007/0279633 A1 | 12/2007 | Yi et al. | |
| 2009/0135415 A1 | 5/2009 | Park | |
| 2020/0284654 A1 * | 9/2020 | Sabry | G01N 33/0009 |
| 2022/0236174 A1 * | 7/2022 | Ghasemi Afshar | |
| | | | G01N 21/0303 |

FOREIGN PATENT DOCUMENTS

| | | | |
|---|---|---|---|
| JP | 2001188037 A | * | 7/2001 |
| JP | 2005337879 A | * | 12/2005 |
| TW | M476923 U | | 4/2014 |
| WO | 9809152 A1 | | 3/1998 |
| WO | 2004051240 A1 | | 6/2004 |

* cited by examiner

OPTICAL MEASURING ASSEMBLY AND GAS SENSOR COMPRISING SAME

This patent application is a national phase filing under section 371 of PCT/EP2020/068627, filed Jul. 2, 2020, which claims the priority of German patent application 10 2019 210 163.1, filed Jul. 10, 2019, each of which is incorporated herein by reference in its entirety.

TECHNICAL FIELD

The present invention relates to an optical measuring arrangement, in particular for a nondispersive infrared (NDIR) sensor or another spectroscopic instrument. The invention furthermore relates to a gas sensor having such an optical measuring arrangement and to a corresponding operating method.

BACKGROUND

Nondispersive infrared (NDIR) sensors are typically used for spectroscopic studies of gases, for example in order to determine a concentration of particular gas components, for instance CO, $CO_2$ or hydrocarbons, in a gas mixture on the basis of absorption lines characteristic of relevant gas molecules in the infrared (IR) range of electromagnetic radiation. Known NDIR gas sensors therefore typically use a chamber which is filled with the gas to be studied and in which a beam path runs from an IR light source to a suitable IR light detector.

In this case, the optical path length between the light source and the light detector should be long enough to achieve measurable absorption by the relevant gas molecules. However, increasing the optical path length generally leads to larger sensor dimensions. Furthermore, in the case of a longer light path the light intensity arriving at the detector is generally also lower because of higher optical losses other than the desired gas absorption, which may lead to an inferior signal/noise ratio. Various design proposals for an optical gas sensor, which address the aforementioned problems, are known:

For example, TWM476923U discloses a gas-filled hollow chamber with an elliptical shape, in which a bifocal property of the elliptical shape is used for more efficient use of the radiation power of a MEMS (Micro-Electro-Mechanical-System) infrared source, by the IR source being arranged at one focus and an IR detector being arranged at another focus of the elliptical hollow chamber.

Furthermore, US 2003/0058439 A1 proposes a gas cell with a hollow chamber for a predetermined gas volume, which is bounded inter alia by a first partially elliptical mirror surface and two further partially elliptical mirror surfaces lying opposite. The gas cell furthermore comprises a light source and one or more detectors suitable for detecting light generated by the light source. The partially elliptical mirror surfaces are arranged relative to one another in such a way that a maximum possible optical path length for a light beam, which is reflected by the aforementioned mirror surfaces and reaches the detectors, is achieved for this arrangement. Specifically, it is a very flatly configured hollow chamber which is bounded in the lateral direction by the aforementioned mirror surfaces.

WO 98/09152 discloses a further gas sensor, which in order to lengthen the optical path length in a gas cell with limited dimensions has three concave mirrors respectively shaped as part of an ellipsoid. Designs having three opposite concave mirror surfaces are however relatively complex to produce, and may furthermore depend sensitively on a suitable light beam direction in relation to the focal positions of the three different concave mirrors.

US 2007/0279633 A1 therefore proposes a further optical gas sensor, in particular an NDIR sensor for measuring a $CO_2$ concentration, having an increased optical path length. This gas sensor has a gas chamber for receiving a gas to be studied, the wall of the gas chamber being formed by two opposite concave mirrors with different focal lengths but a common focal point.

A further optical hollow chamber for an NDIR gas sensor having an increased optical path length is known from US 2009/0135415 A1 and comprises two opposite parabolic mirrors, the common focal point of which lies on their common optical axis, wherein a planar mirror is arranged along the optical axis between the apexes of the parabolic mirrors. So that a large part of the light inside the optical hollow chamber converges toward the detector, an additional ellipsoidal mirror, which focuses diffuse light from the light source at the common focal point, may specifically be provided. In the practically achievable embodiment of such an optical hollow chamber, however, a beam path which deviates from the focal point may occur.

Furthermore, US 2005/0180889 A1 proposes a gas analysis arrangement having a somewhat arcuately configured chamber or tube, which contains a gas to be studied, between light-emitting means and light-receiving means. Specifically, the arcuate chambers may have a square, partially elliptical or partially circular cross section in the vicinity of the light-emitting means, the light-emitting means respectively being arranged at the center, i.e. the geometrical midpoint, of the square, ellipse or circle. The arc shape of the chamber may in particular represent an arc of a part of a circle, or alternatively one with a cylindrical or elliptical curvature instead of a circular curvature, and forms an arcuate concave light-reflecting surface for a divergent or diffuse light beam propagating inside the chamber. The length of the arc defines a corresponding length of the gas analysis arrangement, so that a practical limit is again placed on the optical path length.

SUMMARY

Embodiments provide an optical measuring arrangement, in particular for a nondispersive infrared sensor, and a corresponding gas sensor, which make it possible to increase the optical path length inside the optical measuring arrangement and at the same time to keep its overall dimensions, the optical losses therein and the design complexity within limits.

The starting point is an optical measuring arrangement, in particular for a nondispersive infrared (NDIR) sensor or another spectroscopic instrument. The optical measuring arrangement comprises a tube section-shaped hollow body having a first end face and an opposite second end face. As a purely conceptual aid, a central axis is furthermore defined, which extends centrally through the hollow body from its first end face to its second end face and in the simple case may represent a straight line, or in general a curved line. A spiral-shaped hollow light guide is furthermore formed in an inner surface of the hollow body by the inner surface of the hollow body being formed at least partially from a light-reflecting material and configured in the form of a hollow spiral, which winds around the central axis of the hollow body with a hollow cross section open toward the central axis.

The optical measuring arrangement furthermore has a light source, which may for example comprise one or more LEDs (light-emitting diodes), the light source within the hollow spiral being arranged in such a way in a first spiral end, lying on or close to the first end face of the hollow body, and being configured in such a way, as to emit a light beam into the hollow spiral, substantially tangentially to its turns (or along the turns of the hollow spiral), so that after a plurality of reflections inside the hollow spiral it emerges from a second spiral end lying on or close to a second end face of the hollow body. (Here, "substantially" may be understood in particular as a possible deviation due to manufacturing or design of up to approximately 10% of relevant dimensions or spatial directions.)

The optical measuring arrangement furthermore comprises a light detector which is suitable for the light emitted by the light source, and which may for example comprise one or more photodiode(s), the light detector being arranged in such a way in the second spiral end and being configured so as to detect (receive) the light beam emerging therefrom and to output an electronic measurement signal as a function of the light signal detected in this way.

With such a hollow light guide configured as a hollow spiral in the inner surface of the tube section-shaped hollow body, a spectroscopic instrument having an optical path length which is in principle arbitrarily long because of the simple scalability of the design may be produced particularly in a very narrow installation space, which in principle corresponds only to the outer dimensions of the hollow body, so that for example a correspondingly high and readily measurable absorption by a substance to be studied may be achieved in the hollow light guide. In terms of design, no limits are placed on the number of turns of the hollow spiral. With a suitable optical configuration of the hollow spiral and the arrangement of the light source and the light detector relative thereto (some examples will be given below), the optical losses on the light path between the light source and the light detector may also be minimized and a good signal/noise ratio may therefore be achieved.

One possible application is intended for nondispersive infrared (NDIR) sensors, in particular for spectroscopic studies of gases, for example in order to determine a concentration of particular gas components, for instance CO, $CO_2$ or hydrocarbons, in a gas mixture on the basis of absorption lines characteristic of relevant gas molecules in the infrared (IR) range of electromagnetic radiation. The optical measuring arrangement of the type explained here in this case offers the particular advantage that the gas to be studied may be delivered particularly easily to the hollow light guide, in particular without having to diffuse in. Because of the hollow cross section of the hollow spiral, which is open toward the central axis of the hollow body, the gas to be studied may be introduced straightforwardly into the hollow body or let out therefrom at its end faces, while also filling the hollow light guide virtually without any significant time delay, i.e. immediately.

The optical path length between the light source and the light detector should be long enough to achieve measurable absorption by the relevant gas molecules. However, increasing the optical path length generally leads to larger sensor dimensions. Furthermore, in the case of a longer light path the light intensity arriving at the detector is generally also lower because of higher optical losses other than the desired gas absorption, which may lead to an inferior signal/noise ratio.

Although the hollow cross section of the hollow spiral need not necessarily remain constant along the hollow spiral for the functionality explained here, this does however represent a particularly relevant and favorable case in practice. For the sake of simplicity, "the hollow cross section" is usually referred to here. This is not to be interpreted as restrictive, however, and should be understood as a "respective hollow cross section" in the likewise possible case of a hollow cross section varying along the hollow spiral.

The substantially tangential shining of a light beam into the hollow spiral may, depending on the specific geometrical configuration in a respective application, be selected in such a way that, for example by multiple reflections which are as shallow as possible of the light beam in the interior of the hollow spiral, a proportion which is as high as possible of the light shone into the hollow spiral at the first spiral end arrives at the detector on its second spiral end. For this proportion as well, in principle no limits are placed by the described design, and in particular it may be very high through a suitably selected geometry of the hollow cross section and positioning of the light source and the light detector in relation thereto (examples will be given below).

The light-reflecting material may, for example, have the best possible reflection properties for the light used in the optical measuring arrangement, depending on the application. Purely by way of example, electromagnetic radiation in the infrared range is mostly referred to here, although other spectral ranges, for example in and around the visible spectral range, may equally well also be implemented in the optical measuring arrangement of the type explained here. Suitable light-reflecting materials are known to the person skilled in the art. In particular, to this end the roughness of a suitable light-reflecting material may be about $1/10$ to $1/4$ of the mean wavelength of the light used. Suitable materials are for instance metals, for example gold, silver, aluminum, although it may be the material of the hollow body or a coating of a hollow body made from a different material, for example plastic.

The light source may comprise a collimator, although it does not have to. It is likewise in principle not necessary to couple light into the hollow light guide, since an LED chip positioned, for example, perpendicularly to a turn of the hollow spiral at its first spiral end emits light directly into the hollow spiral. The same also applies correspondingly for a detector on the second spiral end.

According to one embodiment of the optical measuring arrangement, the hollow cross section of the hollow spiral may be configured symmetrically with respect to a crest line of the hollow spiral and as part of an ellipse. In this case, the aforementioned part of the ellipse comprises a first focus of the ellipse. This configuration of the hollow light guide may in particular favor the multiple reflections of a light beam radiated by the light source in the interior of the hollow spiral, so that a large part of the light beam does not leave the hollow light guide and arrives at the light detector on the second spiral end (this will be referred to in brief below as optical properties of the hollow light guide). In this way, in particular, particularly low optical losses—apart from the desired absorption in a medium to be studied, such as a gas—may be achieved on the path of the light beam through the hollow spiral to the light detector.

In one refinement of this embodiment, which is particularly favorable for the same purpose, the light source arranged at the first spiral end is arranged at the first focus of the ellipse, in particular centered around the latter. As an alternative or in addition, in order to enhance the aforementioned effect, the light detector arranged on the second spiral end may also be arranged at the same first focus of the ellipse, in particular centered around the latter.

In one specific configuration of the optical measuring arrangement according to the embodiment above, the respective second focus of an ellipse of a respective hollow cross section of the hollow spiral lies on the central axis of the hollow body at every position along the central axis of the hollow body. In other words, in this configuration the hollow light guide, i.e. the hollow spiral, is formed by rotating the aforementioned ellipse about its second focus, with a simultaneous, in particular uniform, translational movement of the ellipse in a direction perpendicular to its plane, i.e. in the direction of the central axis of the hollow body. In particular, with dimensions of the ellipse remaining constant along the central axis of the hollow body, this leads to a circular inner cross section of the hollow body. This configuration may be particularly favorable both for production and for the above-described optical properties of the hollow light guide, although it is in no way compulsory for the basic functionality explained here of the optical measuring arrangement.

In one specific configuration of the optical measuring arrangement according to the embodiment above, the ratio of the major axis of the ellipse to the minor axis of the ellipse is at least 1.3; preferably at least 1.5; more preferably at least 1.6, or even more, for example about 1.8; 2.0; 2.2 or more. One ratio of the major axis to the minor axis of the ellipse, which is particularly favorable in practice, may be about 5/3. Depending on the structural conditions of a specific application, for example a lateral chip dimension of the light source and/or of the light detector, for the above-described optical properties of the hollow light guide it may be particularly favorable to select an ellipse which is as narrow as possible (i.e. with a ratio of the major axis to the minor axis which is as large as possible) for the hollow cross section of the hollow spiral, and/or a position of the first focus which is as close as possible to the crest line of the hollow spiral in relation to that part of the ellipse area which forms the hollow cross section of the hollow spiral. In particular, structurally related limits may in this case be imposed only by a lateral size of the light source and an intensity and divergence of a light beam fed into the hollow spiral by the light source.

In one specific configuration of the optical measuring arrangement according to the embodiment above or any other embodiment, the hollow spiral can comprise at least 0.5 of a full turn, preferably from 0.8 to 5 full turns, more preferably from 1.5 to 3 full turns, from the first spiral end to the second spiral end. A particularly favorable compromise between the maximally large optical path length on the one hand, and the least possible undesired optical losses during the light propagation in the hollow light guide on the other hand, may for example be achieved with a hollow spiral which comprises about 2 full turns from its first spiral end to its second spiral end.

In one specific configuration of the optical measuring arrangement according to the embodiment above or any other embodiment, the optical measuring arrangement may furthermore comprise a common planar circuit board, on which both the light source and the light detector are arranged, in particular bonded. This may lead to a construction which is particularly favorable in respect of production, for example.

In this case, the common circuit board may for example furthermore comprise an electronic circuit to assist driving of the light source and/or of the light detector and/or readout of the light detector, for example an amplifier in the form of a preamplifier ASIC (application-specific integrated circuit).

Furthermore, in this specific configuration the light source and the light detector may be arranged in the hollow spiral at opposite ends of a diameter of the hollow body, and the common circuit board may be fastened on the hollow body in such a way that the central axis of the latter lies substantially in a plane of the common circuit board. This may again be particularly favorable in respect of production. Furthermore, such planar mounting, aligned along the central axis of the hollow body, of the common circuit board may in particular also lead to minimal or negligible hindrance for a flow of a gas to be studied through the hollow body along its central axis, which may favor constantly uniform filling of the hollow body, and therefore also of the hollow light guide, with this gas.

In one specific configuration of the optical measuring arrangement, the two end faces of the hollow body may be open, i.e. bounded only by respective edges of its tube section-shaped wall, or be closed and have openings, in order for a gas to be studied to enter the hollow body and for the gas to leave the latter.

In one specific configuration of the optical measuring arrangement, it may furthermore comprise a control unit for driving the light source and/or the light detector and/or reading out the light detector and/or for evaluating the electronic measurement signal output by the latter. In one advantageous refinement, the control unit may at least partially be arranged in an internal space of the hollow body, in particular close to or on its central axis, the internal space of the hollow body being bounded radially by a spatial region occupied by the hollow spiral and axially by its two end faces. This may lead to an arrangement which is particularly compact overall, the total size of which is, for example, determined only by outer dimensions of the hollow body.

Embodiments also provide a gas sensor, in particular a nondispersive infrared (NDIR) sensor, which comprises an optical measuring arrangement of the type explained here, which has a control unit as mentioned above and in which the two end faces of the hollow body are open, or are closed and have openings, in order for a gas to be studied to enter the hollow body and for the gas to leave the latter. For example, the first end face of the hollow body or an opening arranged therein may be configured as a gas inlet and the second end face of the hollow body or an opening arranged therein may be configured as a gas outlet for the gas to be studied, or vice versa. The gas sensor may furthermore preferably comprise a user interface for operating and/or monitoring the gas sensor, for example a display with or without input possibilities for a user.

A method for the optical spectral analysis of a gas, which is possible with the described gas sensor, may for example comprise the following steps:

filling the hollow body with a gas to be studied, by introducing the gas into the hollow body through the gas inlet, driving the light source in order to emit a light beam into the hollow spiral, tangentially to its turns, so that after a plurality of reflections inside the hollow spiral the light beam emerges from a second spiral end lying on a second end face of the hollow body, reading out the electronic measurement signal of the light detector and carrying out a spectral analysis of the gas to be studied as a function of the measurement signal read out, and letting the gas to be studied out of the hollow body through the gas outlet for continuous or stepwise replacement of the gas in the hollow body.

BRIEF DESCRIPTION OF THE DRAWINGS

Further advantages, features and details of the invention may be found in the claims, the following description of preferred embodiments and with the aid of the appended drawings. In particular, the above aspects, embodiments and specific configurations will be explained in more detail with the aid of the examples represented in the drawings. The drawings are purely schematic, and in particular are not to be interpreted as true to scale.

FIG. 2 shows the optical measuring arrangement of FIG. 1 in a partially cutaway perspective view to explain details concealed in its interior;

FIG. 3b shows a perspective view, partially represented in cross section, of the hollow body of FIG. 3a;

DETAILED DESCRIPTION OF ILLUSTRATIVE EMBODIMENTS

In the figures, component parts which are the same or similar, or component parts which have the same effect or are similar in effect, are provided with the same references.

Figure 1:
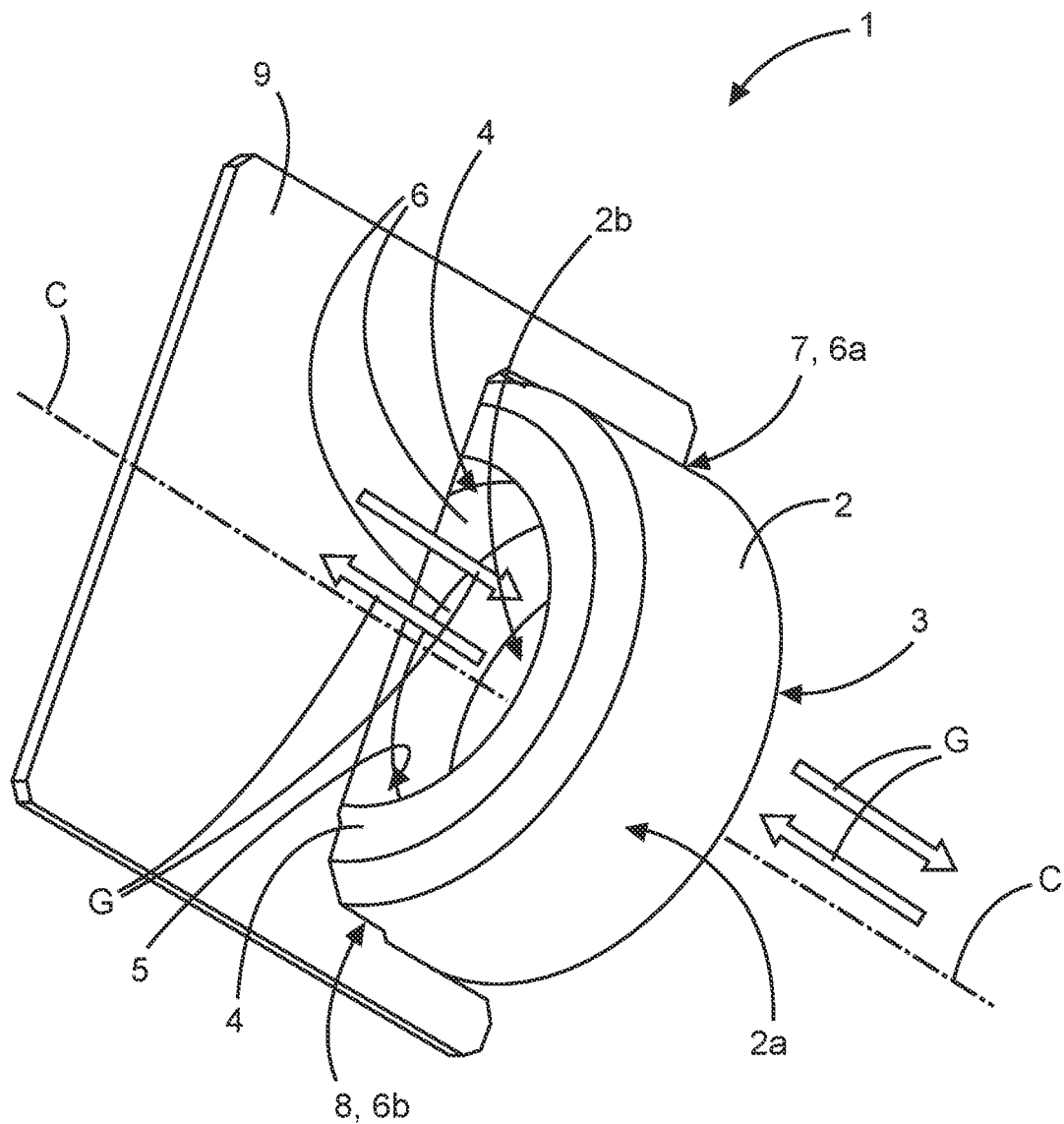
Figure 2:
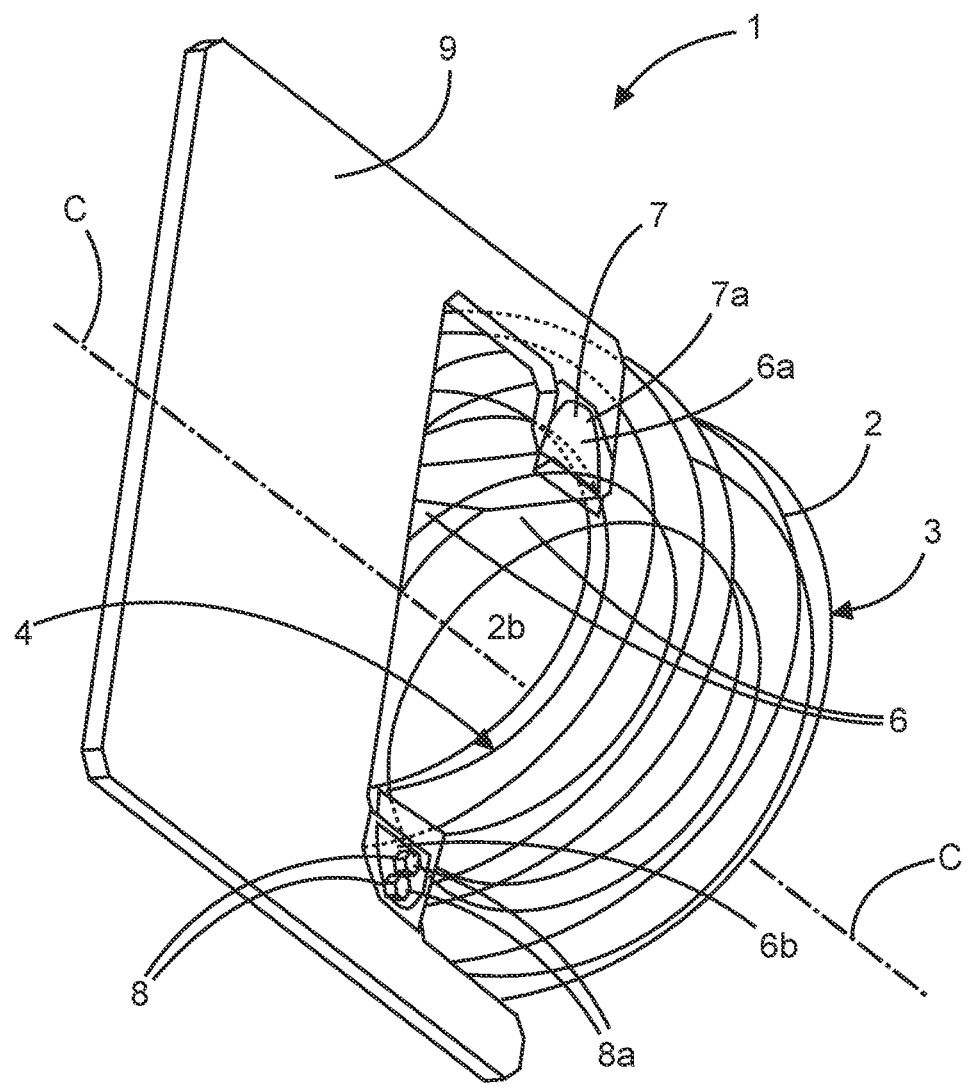
FIG. 2 shows a schematic representation of a perspective view of an optical measuring arrangement according to one embodiment of the invention.

FIGS. 1 and 2 show a schematic representation of a perspective view of an optical measuring arrangement 1 according to one embodiment of the invention, FIG. 2 showing a partially cutaway view, otherwise corresponding to FIG. 1, for better understandability of details concealed in the interior of the optical measuring arrangement 1. The optical measuring arrangement 1 in this example is, in particular, usable for a nondispersive infrared (NDIR) sensor for optically studying gases.

The optical measuring arrangement 1 comprises a tube section-shaped hollow body 2 having a first end face 3, which is open in this example, and an opposite, likewise open second end face 4. Purely by way of example, the hollow body 2 here has a cylindrical outer surface 2a with a circular cross section, the tube section-shaped hollow body 2 not being restricted to such a circular cylindrical shape of its outer surface 2a, but in principle being capable of being configured in any desired way on the outside.

In order to simplify the description, FIG. 1 furthermore schematically indicates a central axis C of the hollow body 2, which extends centrally through an internal space 2b of the hollow body 2 from its first end face 3 to its second end face 4, and which in the simple case represented is a straight line.

In an inner surface 5 of the hollow body 2, a spiral-shaped hollow light guide is formed by the inner surface 5 of the hollow body 2 being formed from a light-reflecting material and configured in the form of a hollow spiral 6 winding around the central axis C of the hollow body 2 with a hollow cross section open toward the central axis C. The hollow cross section of the hollow spiral 6 may, in particular, be seen clearly in the cross-sectional representation of FIG. 3b. The light-reflecting material may, for example, have the best possible reflection properties for the light used in the optical measuring arrangement, depending on the application, in this example in the infrared range of electromagnetic radiation, although the optical measuring arrangement 1 is also usable for spectroscopic studies in other spectral ranges, for example in and around the visible spectral range. Suitable light-reflecting materials are known to the person skilled in the art, for example metals such as gold, silver or aluminum, etc., although it may be the material of the hollow body 2 or a coating of the inner surface 5 in the case of a hollow body 2 made from a different material, for example plastic.

Figure 4:
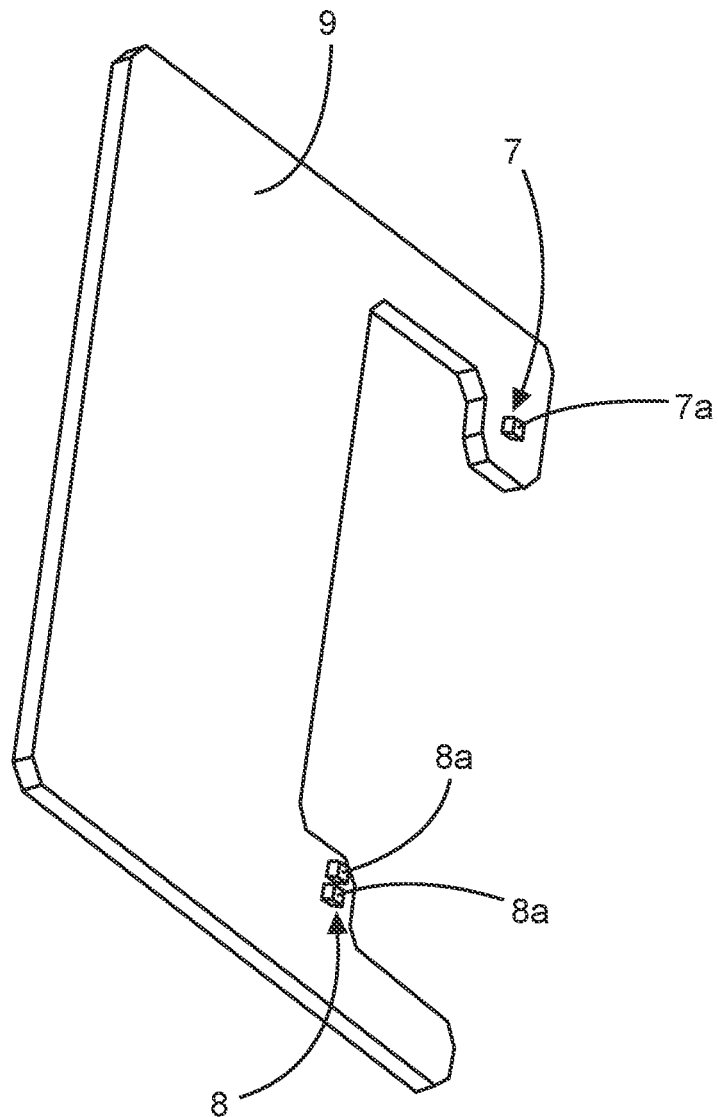
FIG. 4 shows a perspective view of a common planar circuit board of the optical measuring arrangement of FIG. 1, which carries both the light source and the light detector.

The optical measuring arrangement 1 furthermore has a light source 7 which is concealed in FIG. 1 (cf. FIG. 2), which is configured here purely by way of example as an LED (light-emitting diode), as well as a light detector 8 (likewise concealed in FIG. 1, cf. FIG. 2) suitable for the light emitted by the light source 7, which here purely by way of example comprises two photodiodes. In this example, both the light source 7 and the light detector 8 are bonded on a common planar circuit board 9, which are shown separately in FIG. 4, which may lead to a particularly favorable construction, for example in respect of production, mounting and/or driving of the light source 7 and the light detector 8. Optionally, the common circuit board 9 may comprise an electronic circuit which assists the driving of the light source 7 and/or of the light detector 8, for example an amplifier in the form of a preamplifier ASIC (application-specific integrated circuit).

The light source 7 inside the hollow spiral 6 on its first spiral end 6a (concealed in FIG. 1, cf. FIG. 2), which lies closer to the first end face 3 of the hollow body 2, is arranged and configured in such a way that, during operation of the optical measuring arrangement 1 it emits a light beam into the hollow spiral 6, tangentially or along the turns of the hollow spiral 6, so that after a plurality of reflections inside the hollow spiral 6 it emerges at a second spiral end 6b lying on the second end face 4 of the hollow body 2. The light detector 8 is arranged in such a way in the second spiral end 6b, and is configured in such a way, that during operation of the optical measuring arrangement 1 it detects, i.e. receives, the light beam emerging therefrom and as a function of the light signal detected in this way outputs an electronic measurement signal, which may for example be evaluated by a suitable control unit.

As may be seen particularly clearly in FIG. 2, to this end in this example a light-emitting surface 7a of the light source 7 and light-receiving surfaces 8a of the photodiodes of the light detector 8 are respectively arranged and aligned perpendicularly to the direction of the turns of the hollow spiral 6, in other words in a plane of the first spiral end 6a or of the second spiral end 6b, respectively, which in FIG. 2 coincide with the respective hollow cross section of the hollow spiral 6. With this positioning, the light source 7 can emit the light directly into the hollow spiral 6. The same also applies correspondingly for the light detector 8. Therefore, although the light source 7 may comprise a collimator, it does not necessarily have to. Likewise, for this reason it is not necessary to couple light into the hollow light guide.

With such a hollow light guide configured as a hollow spiral 6 in the inner surface 5 of the tube section-shaped hollow body 2, a spectroscopic instrument having an optical path length which is in principle arbitrarily long because of the simple scalability of the design may be produced in a very narrow installation space, which in principle corresponds to the outer dimensions of the hollow body 2, this optical path length corresponding in FIGS. 1 and 2 to the length of the hollow spiral 6 from its first spiral end 6a to its second spiral end 6b. In this way, for example, a sufficiently high and readily measurable absorption by a gas to be studied may be achieved in the hollow light guide. In this example, which (as may for example be seen from the simulation results represented in FIGS. 6 to 8) is highly suitable for spectroscopic studies on gases in view of the propagation of the light beam in the hollow spiral 6, an outer diameter of the hollow body 2 may for example be between about 16 and 20 mm, in particular about 18 mm, and its length measured along the central axis C may for example be about 5 to 6 mm, which overall allows a significant reduction of the total size of a gas sensor with a comparable optical path length in comparison with known devices.

In terms of design, in principle no limits are placed on the number of turns of the hollow spiral 6, and with a suitable optical configuration of the hollow spiral 6 and the arrangement of the light source 7 and the light detector 8 relative thereto (some examples will be given below), the optical losses on the light path between the light source 7 and the light detector 8 may also be minimized and a good signal/noise ratio may therefore be achieved. In the example shown in the figures, for two full turns of the hollow spiral 6, good optical properties were achieved in a purely exemplary manner in respect of the measurement sensitivity on the one hand and the signal/noise ratio on the other hand.

One possible application of the optical measuring arrangement 1 is for spectroscopic studies of gases, for example in an NDIR sensor, for example in order to determine a concentration of particular gas components, for instance CO, $CO_2$ or hydrocarbons, in a gas mixture on the basis of absorption lines characteristic of relevant gas molecules in the infrared range of electromagnetic radiation.

The optical measuring arrangement 1 in this case offers a particular advantage that the gas to be studied may be delivered particularly easily to the hollow light guide through the open end faces 3 and 4 of the hollow body 2, in particular without having to diffuse in. This is schematically indicated in FIG. 1 by arrows G. Because of the hollow cross section of the hollow spiral 6, which is open toward the central axis C of the hollow body 2, the gas to be studied may be introduced straightforwardly into the hollow body or let out therefrom at its end faces, while also filling the hollow light guide virtually without any significant time delay, i.e. immediately. In the specific configuration represented, the light source 7 and the light detector 8 in the hollow spiral 6 are furthermore arranged at opposite ends of a diameter of the hollow body 2, so that the entire circuit board 9 can be fastened on the hollow body 2 in such a way that its central axis C substantially lies in a plane of the common circuit board 9. This may again be particularly favorable in respect of production. Furthermore, such planar mounting, aligned along the central axis C of the hollow body 2, of the common circuit board 9 may in particular also lead to minimal or negligible hindrance for a flow G, indicated by arrows in FIG. 1, of a gas to be studied through the hollow body 2 along its central axis C. This may, for example, favor constantly uniform filling of the hollow body 2, and therefore also of the hollow light guide, with this gas.

Figure 3A:
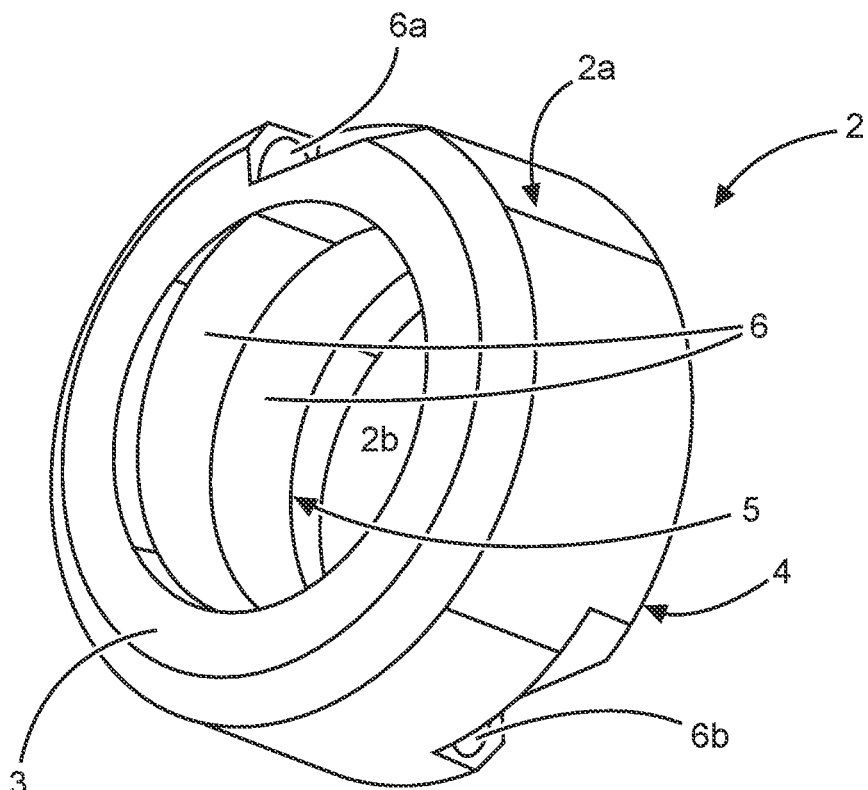
FIG. 3a shows a perspective view of a hollow body of the optical measuring arrangement of FIG. 1.
Figure 3B:
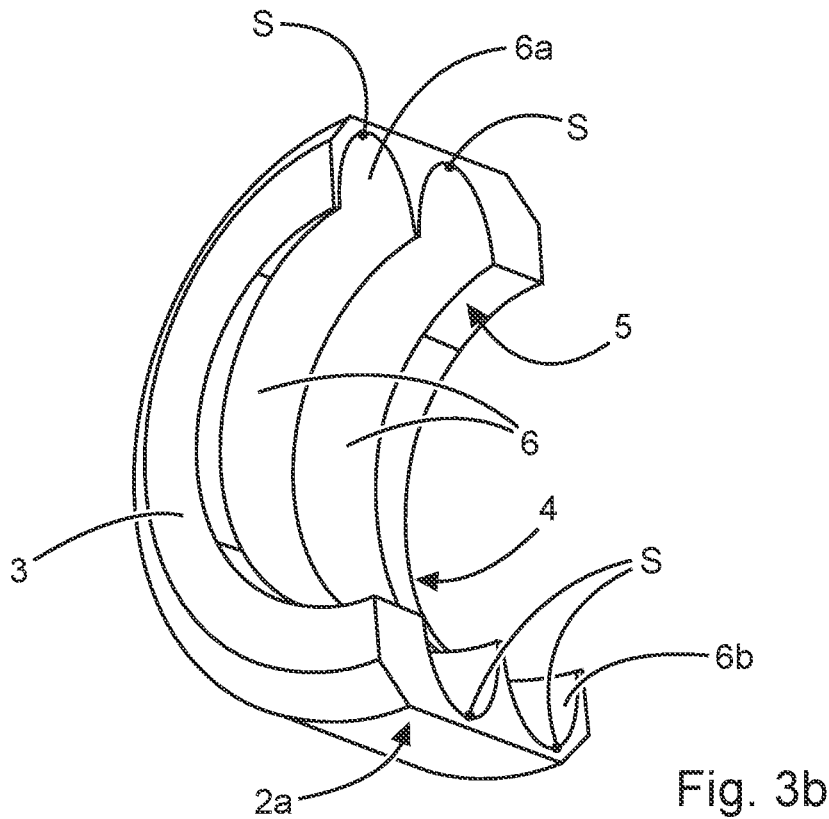

FIG. 3a separately shows the hollow body 2 of the optical measuring arrangement of FIGS. 1 and 2 in a perspective view spatially rotated relative to FIGS. 1 and 2, which allows a better view of the two spiral ends 6a and 6b. FIG. 3b furthermore shows a lower partial half of a hollow body 2 of FIG. 3a which is sectioned along the spiral ends 6a and 6b, to simplify the following explanation of the geometrical configuration of the hollow spiral 6.

In the example shown in the figures, the hollow cross section of the hollow spiral 6 remains constant along the hollow spiral 6, although this is not strictly necessary for the functionality explained here but may represent a particularly relevant and favorable case in practice.

In the embodiment of the optical measuring arrangement 1 as shown in the figures, the hollow cross section of the hollow spiral 6 is configured symmetrically with respect to a crest line S (of which only a point on the section through the hollow body 2 can respectively be seen in FIG. 3b) of the hollow spiral 6 and as part of an ellipse. The aforementioned part of the ellipse comprises a first focus of the ellipse, which may be identified in FIG. 2 by the fact that the light source 7, or the two photodiodes of the light detector 8, are arranged at this first focus of the ellipse.

Such a configuration of the hollow light guide and arrangement of the light source 7 and the light detector 8 may in particular favor multiple reflections of a light beam radiated by the light source 7 in the interior of the hollow spiral 6, so that a large part of the light beam does not leave the hollow light guide and arrives at the light detector 8 on the second spiral end 6b. In this way, for example, particularly low optical losses—apart from the desired absorption in a gas to be studied—may be achieved on the path of the light beam through the hollow spiral 6 to the light detector 8.

In the optical measuring arrangement 1 shown in the figures, purely by way of example, the respective second focus of an ellipse of a respective hollow cross section of the hollow spiral 6 lies on the central axis C of the hollow body 2 at every position along the central axis C of the hollow body 2. In this configuration, in other words, the hollow light guide, i.e. the hollow spiral 6, is formed by rotating the aforementioned ellipse about its second focus, with a simultaneous, in particular uniform, translational movement of the ellipse in a direction perpendicular to its plane, i.e. in the direction of the central axis C of the hollow body 2. In particular, with dimensions of the ellipse remaining constant along the central axis C of the hollow body 2, this leads to a circular inner cross section of the hollow body 2, as shown in the figures. This configuration may be particularly favorable both for production and for the above-described optical properties of the hollow light guide, although it is in no way compulsory for the basic functionality explained here of the optical measuring arrangement 1.

The figures furthermore illustrate a specific example of a favorable ratio of the major axis to the minor axis of the ellipse of about 5/3. Depending on the structural conditions of a specific application, for example a lateral chip dimension of the light source 7 and/or of the light detector 8, for the above-described optical properties of the hollow light guide it may be particularly favorable to select an ellipse which is as narrow as possible (i.e. with a ratio of the major axis to the minor axis which is as large as possible) for the hollow cross section of the hollow spiral 6, and/or a position of the first focus which is as close as possible to the crest line S of the hollow spiral 6 in relation to that part of the ellipse area which forms the hollow cross section of the hollow spiral 6. In particular, structurally related limits may in this case be imposed only by a lateral size of the light source 7 and an intensity and divergence of a light beam fed into the hollow spiral 6 by the light source 7. The specific geometrical parameters mentioned in this example may, for example, for an application with a light source 7 having an LED chip which is square, measuring about 0.4×0.4 $mm^2$ or having an LED chip which is round with a diameter of about 0.3 mm, along the lateral direction, i.e. along the light-emitting surface 7a shown in FIGS. 2 and 4, lead to the good optical properties described here of the optical measuring arrangement 1.

Figure 5:
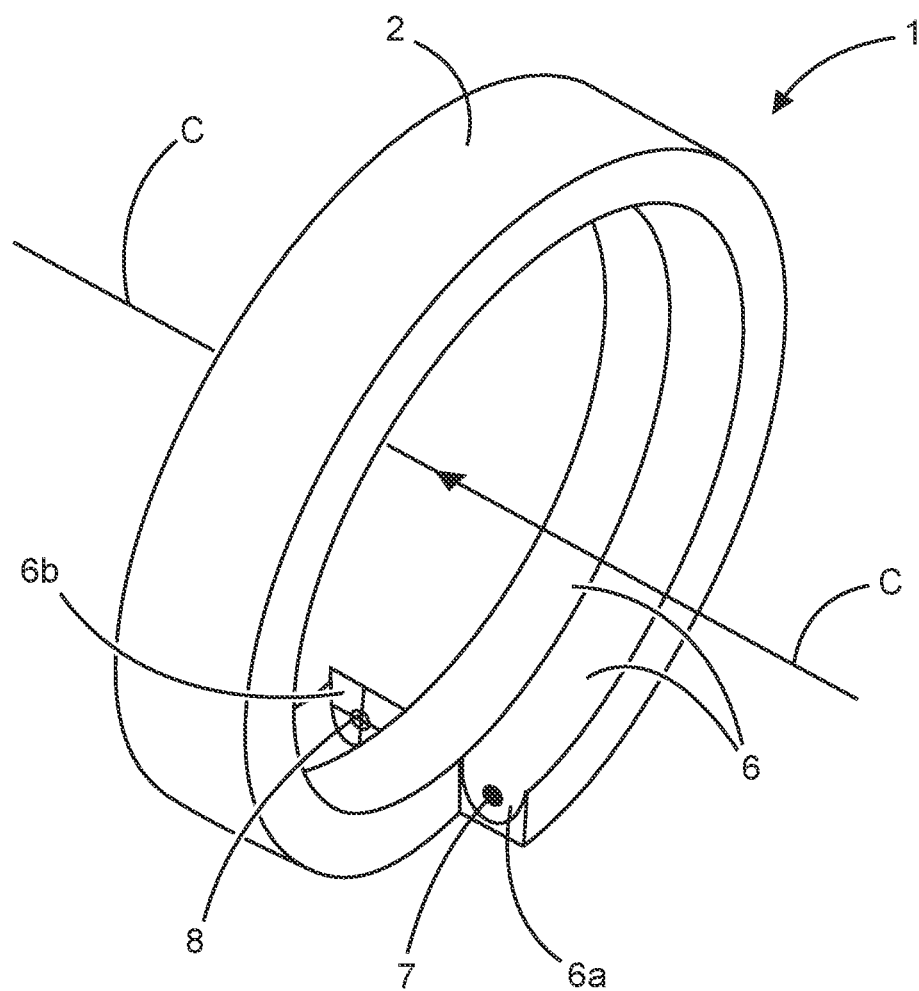
FIG. 5 shows a schematic representation of a further perspective view of an optical measuring arrangement according to one embodiment of the invention according to a computer simulation.
Figure 6:
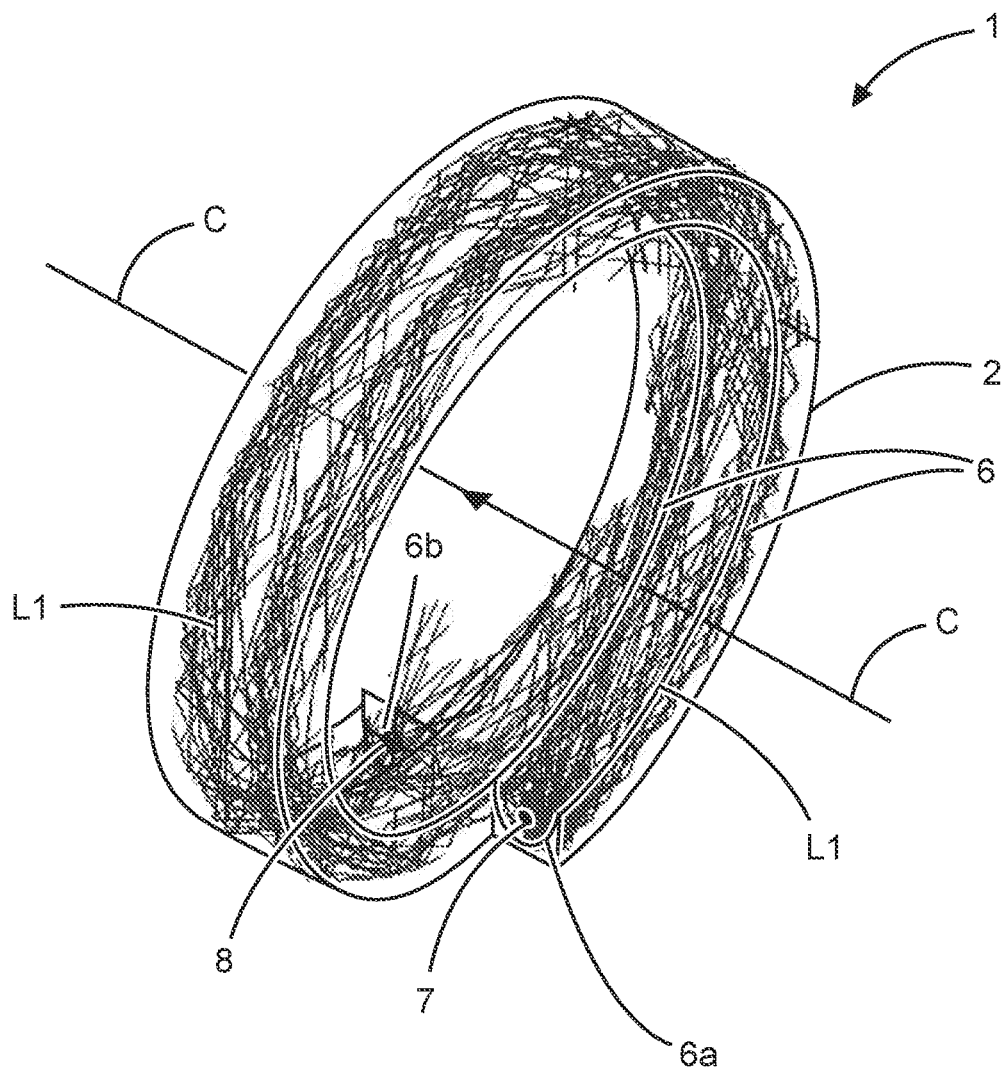
FIG. 6 shows a perspective view of the propagation of a light beam emitted by a light source in the form of a Lambertian emitter in the optical measuring arrangement of FIG. 5 according to a computer simulation.
Figure 7:
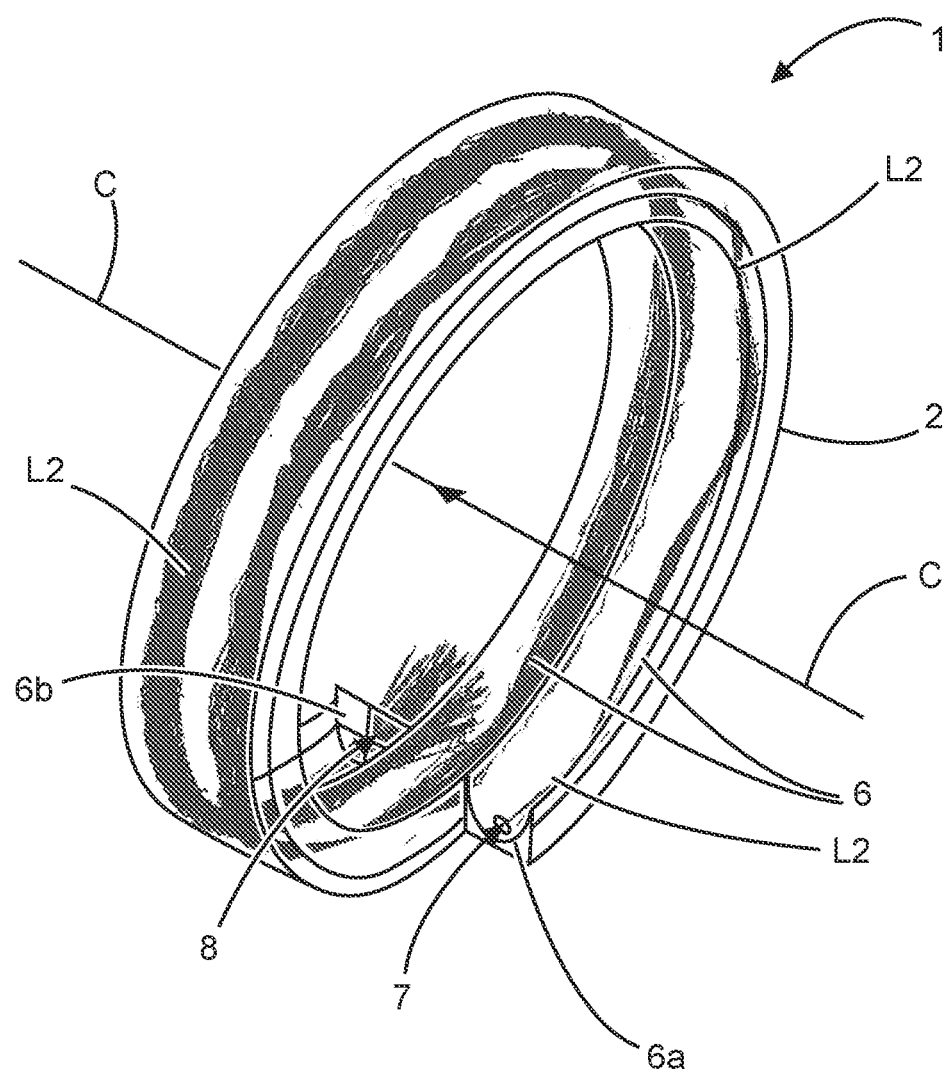
FIG. 7 shows a perspective view of the propagation of a light beam emitted by a collimated light source in the optical measuring arrangement of FIG. 5 according to a computer simulation.

FIG. 5 shows a schematic representation of a further perspective view of an optical measuring arrangement 1 the configuration of which corresponds to that of FIG. 1 to 5, according to a computer simulation for studying the light propagation in its hollow light guide. FIG. 6 shows the corresponding simulation result for the propagation of a light beam L1 emitted by a light source 7 in the form of a Lambertian emitter in the optical measuring arrangement 1 of FIG. 5. FIG. 7 shows the corresponding simulation result for the propagation of a collimated light beam L2, emitted by a light source 7 which comprises a collimator, in the optical measuring arrangement 1 of FIG. 5. As may be seen therefrom, in both cases a large part of the light beam L1 or L2 remains in the hollow spiral 6 during the plurality of reflections in its interior, i.e. does not leave the hollow light guide and therefore arrives at the light detector 8 on the second spiral end 6b.

Figure 8:
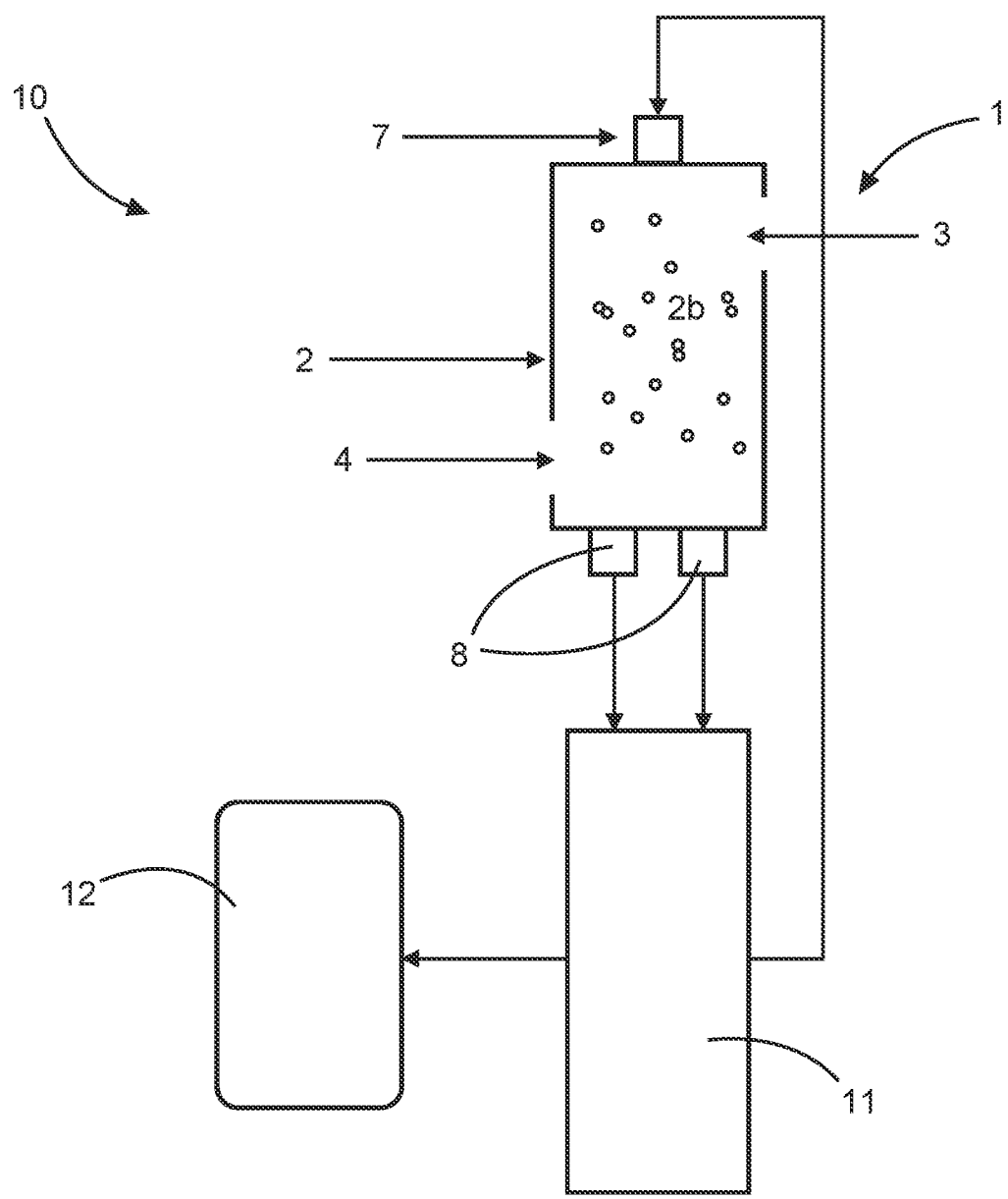
FIG. 8 shows a schematic block diagram of a gas sensor according to one embodiment of the invention with an optical measuring arrangement.

Lastly, FIG. 8 shows a schematic block diagram of a gas sensor 10 according to an embodiment of the invention, in particular a nondispersive infrared (NDIR) sensor, which comprises an optical measuring arrangement 1 of the type explained here, which may in particular be configured as in FIG. 1 to 7. In FIG. 8, the elements described above and represented in more detail in FIG. 1 to 4, such as the hollow body 2 with the spiral-shaped hollow light guide formed in its inner surface, end faces 3 and 4 of the hollow body which are configured as a gas inlet and a gas outlet, the light source 7 and the light detector 8 are indicated purely schematically.

The gas sensor 10 furthermore has a control unit ii, which can for example at least partially be arranged in an internal space 2b of the hollow body 2, in particular close to or on its central axis C (cf. FIG. 1 to 3a), the internal space 2b of the hollow body 1 being bounded radially by a spatial region occupied by the hollow spiral 6 and axially by its two end faces 3 and 4. This may lead to an arrangement which is particularly compact overall, in which the total size of the gas sensor 10 is determined only by outer dimensions of the hollow body 2. As an alternative, however, the control unit ii may also be arranged outside the hollow body 2. The control unit ii can for example be adapted to drive the light source 7 and/or the light detector 8 and/or to read out the light detector 8 and/or to evaluate the electronic measurement signal output by the latter. Preferably, the gas sensor 10 may furthermore comprise a user interface 12 for operating and/or monitoring the gas sensor 10, for example a display with or without input possibilities for a user.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. An optical measuring arrangement comprising:
a tube section-shaped hollow body having a central axis extending from a first end face to an opposite second end face of the hollow body;
a spiral-shaped hollow light guide formed in an inner surface of the hollow body, wherein the inner surface comprises at least partially a light-reflecting material, and wherein the spiral-shaped hollow light guide is a hollow spiral winding around the central axis with hollow cross sections open toward the central axis;
a light source arranged at a first spiral end and at the first end face of the hollow body, the light source configured to emit a light beam into the hollow spiral so that the light beam, after a plurality of reflections inside the hollow spiral, emerges from a second spiral end at the second end face of the hollow body;
a light detector arranged at the second spiral end, the light detector configured to detect the emerging light beam and to output an electronic measurement signal as a function of the detected light beam; and
a common planar circuit board carrying both the light source and the light detector,
wherein the light source and the light detector are arranged in the hollow spiral at opposite end sections of an inner diameter of the hollow body, and
wherein the common circuit board is fastened on the hollow body in such a way that the central axis of the latter lies in a plane of the common circuit board.

2. The optical measuring arrangement of claim 1, wherein each hollow cross section of the hollow spiral is part of an ellipse, and wherein each ellipse comprises a first focus.

3. The optical measuring arrangement of claim 2, wherein the light source is arranged at a first focus of a first ellipse.

4. The optical measuring arrangement of claim 2, wherein the light detector is arranged at a first focus of a second ellipse.

5. The optical measuring arrangement of claim 2, wherein each ellipse comprises a respective second focus, and wherein each second focus lies on the central axis of the hollow body.

6. The optical measuring arrangement of claim 5, wherein a ratio of a major axis of an ellipse to a minor axis of the ellipse is at least 1.3.

7. The optical measuring arrangement of claim 1, wherein the hollow spiral comprises at least 0.5 of a full turn from the first spiral end to the second spiral end.

8. The optical measuring arrangement of claim 1, further comprising a control unit configured to drive the light source and/or the light detector and/or to read out the light detector and/or to evaluate the electronic measurement signal by the latter.

9. The optical measuring arrangement of claim 8, wherein the control unit is at least partially arranged in an internal space of the hollow body, the internal space of the hollow body being bounded radially by a spatial region occupied by the hollow spiral and axially by its two end faces.

10. The optical measuring arrangement of claim 1, wherein the two end faces of the hollow body are open or are closed having openings so that a gas is able to enter and the gas is able to leave.

11. A gas sensor comprising:
the optical measuring arrangement of claim 10,
wherein the first end face of the hollow body or an opening arranged therein is configured as a gas inlet and the second end face of the hollow body or the opening arranged therein is configured as a gas outlet for the gas; and
a user interface configured to operate or monitor the gas sensor.

12. The gas sensor of claim 11, wherein the gas sensor is a nondispersive infrared (NDIR) sensor.

13. A method for spectral optically analyzing the gas, the method comprising:
- providing the gas sensor of claim 11;
- filling the hollow body with the gas by introducing the gas into the hollow body through the gas inlet;
- driving the light source in order to emit the light beam into the hollow spiral, tangentially to its turns, so that after the plurality of reflections inside the hollow spiral it emerges from the second spiral end lying on the second end face of the hollow body;
- reading out the electronic measurement signal of the light detector and performing a spectral analysis of the gas as the function of the read out measurement signal; and
- letting the gas out of the hollow body through the gas outlet for continuous or stepwise replacement of the gas in the hollow body.

14. An optical measuring arrangement comprising:
- a tube section-shaped hollow body having a central axis extending from a first end face to an opposite second end face of the hollow body;
- a spiral-shaped hollow light guide formed in an inner surface of the hollow body, wherein the inner surface comprises at least partially a light-reflecting material, and wherein the spiral-shaped hollow light guide is a hollow spiral winding around the central axis with hollow cross sections open toward the central axis;
- a light source arranged at a first spiral end and at the first end face of the hollow body, the light source configured to emit a light beam into the hollow spiral so that the light beam, after a plurality of reflections inside the hollow spiral, emerges from a second spiral end at the second end face of the hollow body; and
- a light detector arranged at the second spiral end, the light detector configured to detect the emerging light beam and to output an electronic measurement signal as a function of the detected light beam,
- wherein each hollow cross section of the hollow spiral is part of an ellipse, and
- wherein the light source is arranged at a first focus of a first ellipse.

15. The optical measuring arrangement of claim 14, further comprising a common planar circuit board, which carries both the light source and the light detector.

16. The optical measuring arrangement of claim 15, wherein the common circuit board further comprises an electronic circuit configured to drive the light source and/or of the light detector and/or a readout of the light detector.

17. The optical measuring arrangement of claim 15, wherein the light source and the light detector are arranged in the hollow spiral at opposite end sections of an inner diameter of the hollow body, and wherein the common circuit board is fastened on the hollow body in such a way that the central axis of the latter lies in a plane of the common circuit board.

18. The optical measuring arrangement of claim 14, wherein the light detector is arranged at a first focus of a second ellipse.

19. The optical measuring arrangement of claim 14, wherein each ellipse comprises a second focus, and wherein each second focus lies on the central axis of the hollow body.

20. An optical measuring arrangement comprising:
- a tube section-shaped hollow body having a central axis extending from a first end face to an opposite second end face of the hollow body;
- a spiral-shaped hollow light guide formed in an inner surface of the hollow body, wherein the inner surface comprises at least partially a light-reflecting material, and wherein the spiral-shaped hollow light guide is a hollow spiral winding around the central axis with hollow cross sections open toward the central axis;
- a light source arranged at a first spiral end and at the first end face of the hollow body, the light source configured to emit a light beam into the hollow spiral so that the light beam, after a plurality of reflections inside the hollow spiral, emerges from a second spiral end at the second end face of the hollow body; and
- a light detector arranged at the second spiral end, the light detector configured to detect the emerging light beam and to output an electronic measurement signal as a function of the detected light beam,
- wherein each hollow cross section of the hollow spiral is part of an ellipse, and
- wherein the light detector is arranged at a first focus of a second ellipse.

\* \* \* \* \*